United States Patent
Sakida et al.

(10) Patent No.: US 8,124,041 B2
(45) Date of Patent: Feb. 28, 2012

(54) PROCESS FOR PRODUCING SILICON

(75) Inventors: Manabu Sakida, Shunan (JP); Satoru Wakamatsu, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 0 days.

(21) Appl. No.: 12/937,912

(22) PCT Filed: Apr. 16, 2009

(86) PCT No.: PCT/JP2009/057653
§ 371 (c)(1), (2), (4) Date: Oct. 14, 2010

(87) PCT Pub. No.: WO2009/128501
PCT Pub. Date: Oct. 22, 2009

(65) Prior Publication Data
US 2011/0044878 A1 Feb. 24, 2011

(30) Foreign Application Priority Data
Apr. 17, 2008 (JP) .................. 2008-108203

(51) Int. Cl.
*C01B 33/02* (2006.01)
(52) U.S. Cl. ........ 423/350; 423/348; 423/349; 423/342; 423/585; 423/324; 422/198; 422/129; 422/139; 422/145; 422/211; 118/724; 118/725; 117/204; 117/25; 117/31; 117/33; 117/35
(58) Field of Classification Search .................. None
See application file for complete search history.

(56) References Cited

U.S. PATENT DOCUMENTS

| 4,805,556 | A * | 2/1989 | Hagan et al. ............... 118/725 |
| 2004/0052716 | A1* | 3/2004 | Wakamatsu et al. .......... 423/350 |
| 2007/0264173 | A1* | 11/2007 | Sakida et al. ............... 422/198 |
| 2009/0098039 | A1 | 4/2009 | Wakamatsu et al. |

FOREIGN PATENT DOCUMENTS

| JP | 11049509 A | 2/1999 |
| JP | 2003095635 A | 4/2003 |
| JP | 2005008430 A | 1/2005 |
| JP | 2006321675 A | 11/2006 |

* cited by examiner

*Primary Examiner* — Melvin Mayes
*Assistant Examiner* — Smita Patel
(74) *Attorney, Agent, or Firm* — The Webb Law Firm

(57) ABSTRACT

A process for producing silicon comprises the steps of a reduction step [1] of depositing silicon by reacting chlorosilanes and hydrogen in a reactor under heat and discharging an exhaust gas that contains hydrogen, oligomers of silanes, and a silicon powder; a carring step [2] of carrying the exhaust gas that has been exhausted in the step [1] while keeping a temperature of the exhaust gas at not less than 105° C.; a removal step [3] of supplying the exhaust gas that has been carried in the step [2] to a filter at a temperature of not less than 105° C. and discharging the exhaust gas from the filter at a temperature of not less than 105° C. to remove the silicon powder from the exhaust gas and give a mixed gas that contains the hydrogen and the oligomers of silanes; and a separation step [4] of cooling the mixed gas that has been obtained in the step [3] to separate the hydrogen as a gas phase from the mixed gas.

5 Claims, 2 Drawing Sheets

[Fig.1]
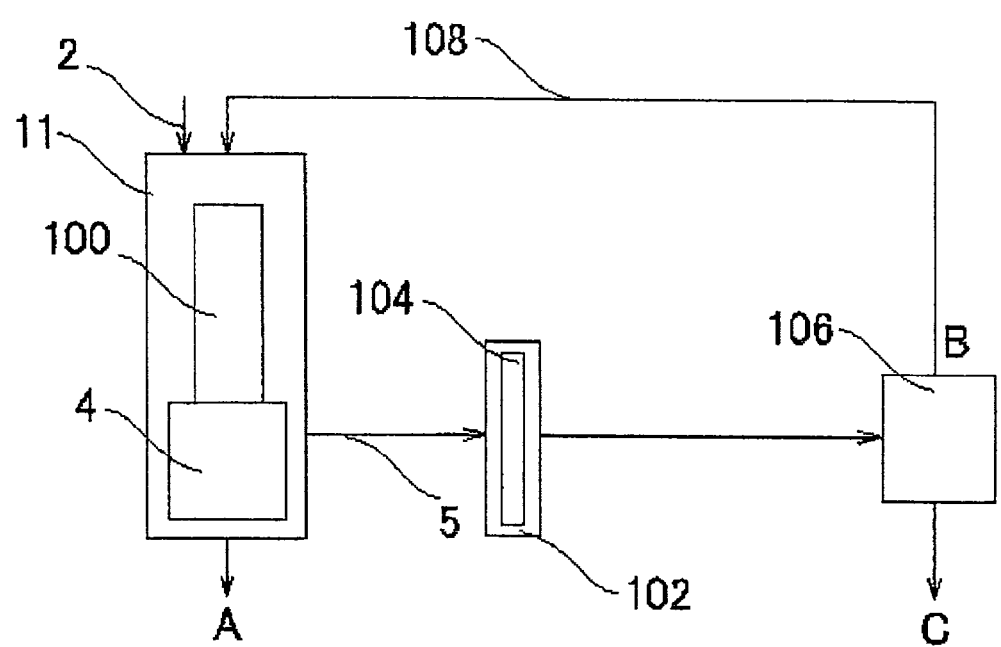

[Fig.2]
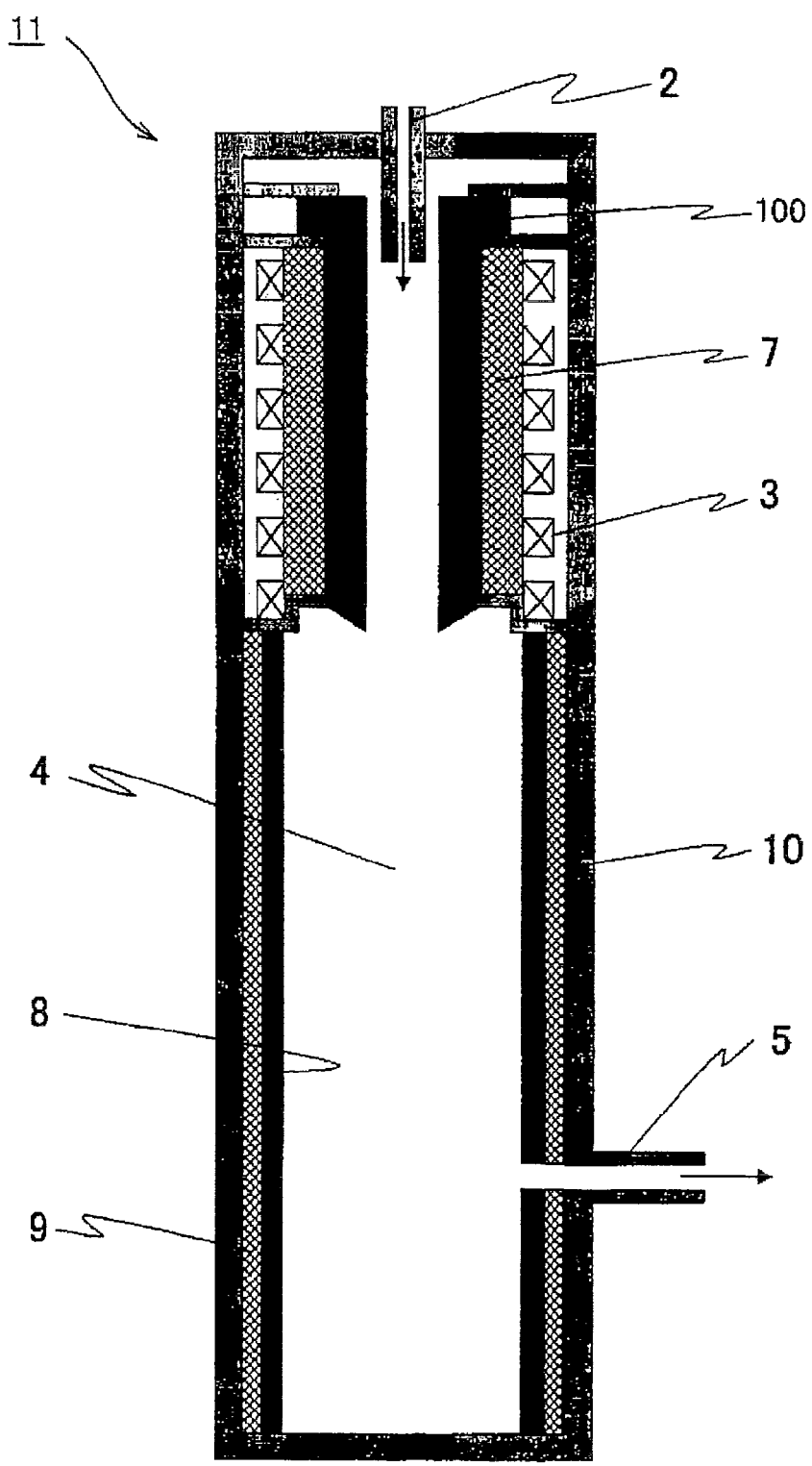

PROCESS FOR PRODUCING SILICON

TECHNICAL FIELD

The present invention relates to a process for producing silicon. More specifically, the present invention relates to a process for producing silicon comprising removing a silicon powder at a step different from a step of removing oligomers of silanes from an exhaust gas discharged in a deposition reaction using chlorosilanes.

BACKGROUND ART

Polycrystal silicon is suitably used as a raw material of semiconductors and solar cells which are further going to be developed and demanded in the days to come. In a process for producing polycrystal silicon, an apparatus for producing polycrystal silicon provided with a reacting furnace and a circulation type purification system is used. In the reacting furnace, polycrystal silicon is manufactured from a mixed gas of chlorosilanes and hydrogen. In the purification system, a hydrogen gas is extracted from an exhaust gas that has been generated in the reacting furnace and the hydrogen gas is reintroduced into the reacting furnace.

However, oligomers of silanes ($Si_xH_yCl_z$) and a silicon powder that are obtained as a by-product in a process for producing polycrystal silicon adhere to a pipe whereby the pipe becomes blocked and the apparatus is damaged in a continuous operation of the apparatus for producing polycrystal silicon.

Under these circumstances, in the Patent documents 1 and 2, a filter made of activated carbon or the like is disposed on the upstream side of at least one unit that configures the above described purification system and an exhaust gas is made to pass through the filter.

PRIOR ART DOCUMENTS

Patent document 1: Japanese Patent Application Laid-Open Publication No. 2003-95635
Patent document 2: Japanese Patent Application Laid-Open Publication No. 2005-8430

However, in these cases, both of oligomers of silanes and a silicon powder adhere to a filter. When the filter to which the oligomers of silanes and silicon powder have adhered is used for a certain period of time, the adsorption ability of the filter is degraded, whereby it is necessary that the filter is exchanged or regenerated. If the silicon powder adheres to the filter alone, the filter can be simply regenerated by brushing the powder off. However, if both of the oligomers of silanes and silicon powder adhere to the filter, it is impossible that the filter is simply regenerated by brushing the powder off because they tightly adhere to the filter. Consequently, it is necessary to open the filter for maintenance. However, since the oligomers of silanes ignite in air, the maintenance is full of hazards and cumbersome.

An object of the present invention is to provide a process for producing silicon by a hydrogen reducing reaction of chlorosilanes safely and continuously.

SUMMARY OF THE INVENTION

As a result of earnest studies, the present inventors have found that the above problems can be solved by collecting the silicon powder that is obtained as a by-product in a step of a deposition of silicon at a step different from a step of collecting the oligomers of silanes ($Si_xH_yCl_z$), whereby the present invention has been completed.

A process for producing silicon according to the present invention is characterized by comprising the steps of
a reduction step [1] of depositing silicon by reacting chlorosilanes and hydrogen in a reactor under heat and discharging an exhaust gas that contains hydrogen, oligomers of silanes, and a silicon powder;
a carring step [2] of carrying the exhaust gas that has been exhausted in the step [1] while keeping a temperature of the exhaust gas at not less than 105° C.;
a removal step [3] of supplying the exhaust gas that has been carried in the step [2] to a filter at a temperature of not less than 105° C. and discharging the exhaust gas from the filter at a temperature of not less than 105° C. to remove the silicon powder from the exhaust gas and give a mixed gas that contains the hydrogen and the oligomers of silanes;
a separation step [4] of cooling the mixed gas that has been obtained in the step [3] to separate the hydrogen as a gas phase from the mixed gas; and supply step [5] of supplying the hydrogen that has been obtained in the step [4] to the reactor.

It is preferable that in the process for producing silicon according to the present invention, the filters are disposed in parallel and switched to one another in the carrier step and the process further comprises a step [6] of switching to the filter that has been heated up to 105° C.

The above step [1] is a step for carrying out a reaction in which chlorosilanes and hydrogen are supplied from a source gas supply pipe into a reactor that has been heated to deposit silicon. When the deposition temperature is at least 1200° C., in particular in the range of 1300° C. to 1700° C. in the step [1], of the silicon powder and oligomers of silanes significantly generate, whereby the present invention can be effectively applied. More specifically, it is preferable that the step [1] is a step for supplying chlorosilanes and hydrogen into a cylindrical reactor made of graphite to deposit silicon on the inner surface of the reactor, and dropping and collecting the silicon from the cylindrical reactor by melting a part or the whole of the silicon that has been deposited.

In the present invention, the silicon powder that is generated as a by-product in the hydrogen reducing step of chlorosilanes (the step of a deposition reaction of silicon in which chlorosilanes are used) is collected at a step different from a step of collecting the oligomers of silanes, whereby the resultant silicon can be obtained safely and continuously.

BRIEF DESCRIPTION OF THE DRAWINGS

FIG. 1 is a schematic view for illustrating the present invention; and
FIG. 2 is a schematic view for illustrating the present invention.

BEST MODE OF CARRYING OUT THE INVENTION

The present invention will be described below in detail.
In the process for producing silicon according to the present invention, a publicly known silicon producing apparatus is used to carry out a hydrogen reduction of chlorosilanes and to deposit silicon (see FIGS. 1 and 2). For instance, the silicon producing apparatus is provided with a source gas supply pipe 2 for supplying chlorosilanes and hydrogen (a source gas) into a reactor 100, the reactor 100 that is disposed in a reaction apparatus 11, an exhaust gas collecting chamber 4 that is connected to the reactor 100 and collects a gas that has been discharged from the reactor, a gas discharge pipe 5 for discharging the exhaust gas that has been collected into the exhaust gas collecting chamber and introducing the exhaust gas into a filter apparatus 102, the filter apparatus 102 in which a filter 104 is disposed, a cooling part 106 for cooling a mixed gas that has been discharged from the filter apparatus 102, and a supply pipe 108 for supplying hydrogen that has been separated in the cooling part 106 into the reactor 100.

The process according to the present invention contains the following steps [1] to [5]. It is preferable that the process according to the present invention further contains a step [6].

[Reduction Step [1]]

A reduction step [1] is a step for depositing silicon by reacting chlorosilanes (trichlorosilane preferably) and hydrogen in the reactor 100 to which a source gas has been supplied under heat, and for discharging an exhaust gas that contains hydrogen, oligomers of silanes, and a silicon powder (see FIG. 1). More specifically, in the step [1], chlorosilanes and hydrogen are supplied from the source gas supply pipe 2 into the heated cylindrical reactor 100 made of graphite that is disposed in the reaction apparatus 11 and allowed to react, silicon is deposited on the inner surface of the cylindrical reactor 100, and a part or a whole of silicon that has been deposited is melted to drop from the cylindrical reactor 100 and collect. In the present specification, the process for producing silicon by the above described steps is also referred to as the "Vapor-to-liquid deposition method".

In detail, the reactor 100 that is used for the Vapor-to-liquid deposition method is usually a tube made of graphite provided with an opening part at the lower end. At first, the reactor 100 is heated, then a source gas that contains chlorosilanes and hydrogen is supplied to the reactor 100, and a reaction of the chlorosilanes and hydrogen is carried out. More specifically, the inner surface of the reactor 100 is heated up to a temperature that is suitable for a deposition reaction of silicon (at least 1200° C. generally, in particular in the range of 1300° C. to 1700° C.). By this step, silicon is deposited on the inner surface of the reactor 100. In the next step, in order to melt the deposited silicon, the reactor 100 is heated up to at least a temperature at which silicon is melted, that is, at least a melting point of silicon. With respect to the collection of silicon A that has melted and dropped, a silicon collecting container may be disposed at the bottom of the reaction apparatus and the silicon collecting container may be carried out of the reaction apparatus at the stage in which silicon is stored to some extent, or an ejecting port of silicon melt can be formed to eject silicon in a continuously or in intermittently.

Moreover, in the step [1], silicon is deposited as described above, and the exhaust gas that contains hydrogen that is a raw material, and oligomers of silanes and a silicon powder that has been obtained as a by-product is discharged. More specifically, the exhaust gas is collected into the exhaust gas collecting chamber, i.e., held in the exhaust gas collecting chamber 4, and then the exhaust gas is discharged from the reaction apparatus 11 through the gas discharge pipe 5.

Moreover, the exhaust gas also contains trichlorosilane ($SiHCl_3$) that is a raw material, chlorosilanes that has been obtained as a by-product (monochlorosilane ($SiH_3Cl$), dichlorosilane ($SiH_2Cl_2$) and silicon tetrachloride ($SiCl_4$) more specifically) and hydrogen chloride (HCl). The oligomers of silanes include $Si_2HCl_5$, $Si_2H_2Cl_4$, $Si_2Cl_6$ and the like. The boiling points of the oligomers of silanes are higher than that of silicon tetrachloride, and the oligomers of silanes tend to condensate. In the present specification, chlorosilanes represent monochlorosilane, dichlorosilane, trichlorosilane, and silicon tetrachloride.

The oligomers of silanes that are discharged in the Vapor-to-liquid deposition method include oligomers of silanes such as $Si_2Cl_6$ as described above. In the step [1], when the amount of the by-product is reduced as much as possible, lower temperature of the filter for removing a fine powder can be set as described later. Consequently, it is preferable that reaction conditions such as a temperature are controlled in such a manner that the amount of oligomers of silanes in the exhaust gas is in the range of 0.001 to 0.1 mol % generally, in the range of 0.001 to 0.01 mol % preferably.

When silicon is deposited at 1200° C. or more as described above, the removing ability of the filter is degraded relatively quickly since the exhaust gas contains the silicon powder in a relative large amount. However, by the process according to the present invention, the adhesion of oligomers of silanes to a filter can be effectively prevented as described later, whereby the frequency of opening the filter for maintenance can be reduced. Consequently, silicon can be produced safely and continuously even in the case of the Vapor-to-liquid deposition method.

The temperature of the exhaust gas is in the range of 700° C. to 1500° C. generally at an outlet port of the reactor 100 (an inlet port of the exhaust gas collecting chamber 4) and at an inlet port of the gas discharge pipe 5 (an outlet port of the exhaust gas collecting chamber 4). The components other than the silicon powder in the exhaust gas exist as a gas.

The configuration of the reaction apparatus 11 will be described in detail below (see FIG. 2).

(Reactor)

The reactor 100 that carries out a reaction of the chlorosilanes and hydrogen is not restricted as of the hydrogen reduction of the chlorosilanes can be carried out satisfactorily. As shown in FIG. 2, the reactor 100 may be a cylindrical reactor provided with an opening part at the lower end for instance. This reactor ensures that silicon is dropped and collected continuously or intermittently by heating and melting a part or the whole of silicon that has been deposited.

The reactor 100 is heated by using a heater 3 described later. The inner surface of the reactor 100 is heated up to a temperature that is suitable for the hydrogen reducing reaction of chlorosilanes.

The cross sectional shape of the reactor 100 and the shape of the opening part are not restricted as long as the production efficiency of silicon is not disturbed. The upper end of the reactor 100 can be in a flange shape as shown in FIG. 2.

The reactor 100 is heated up to at a melting point of silicon or higher, and the inner part of the reactor 100 comes into contact with silanes and silicon melt. Consequently, it is preferable to select a material of the vessel that is suitable for the temperature conditions and that can be resistant to the contact with substances sufficiently. As such materials, there can be mentioned for instance carbon materials such as graphite and ceramics materials such as silicon carbide, silicon nitride, boron nitride, and aluminum nitride.

(Heater)

The heater 3 is not restricted as long as that the heater 3 can heat the inner wall of the reactor 100 up to a a melting point of silicon or higher. In consideration of the energy efficiency or the like, it is preferable that a high frequency coil is used. Moreover, in consideration of the heating efficiency or the like, it is preferable that a heat insulator 7 is disposed between the reactor 100 and the heater 3 as shown in FIG. 2.

[Carrying Step [2]]

A carrier step [2] is a process for carrying the exhaust gas that has been discharged in the step [1] while keeping a temperature of the exhaust gas at not less than 105° C. (see FIG. 1). More specifically, the carrier step [2] is a step for carrying the exhaust gas from the outlet port of the reactor 100 to the filter 104 (ranges covered by the exhaust gas collecting chamber 4 and the gas discharge pipe 5 shown in the figure) while keeping a temperature of the exhaust gas at not less than 105° C. According to the present invention, it is preferable that the exhaust gas is carried so that the temperature of the exhaust gas in the filter 104 is kept in the range of 150° C. to 280° C.

The configuration of the exhaust gas collecting chamber 4 and the gas discharge pipe 5 will be described in detail below (see FIG. 2).

(Exhaust Gas Collecting Chamber)

The exhaust gas collecting chamber 4 is provided to connect with the reactor 100 as needed. After the exhaust gas that has been discharged from the reactor 100 is collected into the collecting chamber, the exhaust gas is supplied to a removal step [3] through the gas discharge pipe 5 that connects with the exhaust gas collecting chamber 4. Consequently, in the case where the exhaust gas collecting chamber 4 is provided in the present invention, the exhaust gas collecting chamber 4 and the gas discharge pipe configure the carrier step. The size of the exhaust gas collecting chamber 4 can be specified in consideration of a supply amount of the source gas and a residence time of the exhaust gas in the exhaust gas collecting chamber 4. As shown in FIG. 2, a carbon material 8, a heat insulator 9, and a metal wall 10 are disposed around the exhaust gas collecting chamber 4.

The exhaust gas that has been discharged from the reactor 100 at 700° C. to 1500° C., preferably in the range of 700° C. to 1300° C., contains the chlorosilanes that are unreacted or are generated by a reaction, the hydrogen gas and the hydrogen chloride gas.

(Gas Discharge Pipe)

The gas discharge pipe 5 is provided in the carrier step to supply the exhaust gas that has been collected in the exhaust gas collecting chamber 4 to the removal step [3]. As long as the gas discharge pipe can carry the exhaust gas at the above described temperature and keep the exhaust gas at 105° C. or higher, a cooling part or a heating part may be provided along the pipe as needed, and the gas discharge pipe 5 may be kept warm by a heat insulator.

When the temperature of the exhaust gas that is supplied to the removal step [3] is in the above range, the oligomers of silanes can exist as a gas phase in the exhaust gas. Consequently, when the exhaust gas is introduced to the filter 104, the oligomers of silanes can be prevented from adhering to the filter 104.

[Removal Step [3]]

The removal step [3] is a step for supplying the exhaust gas that has carried in the step [2] to the filter 104 at a temperature of at least 105° C., making the exhaust gas to pass through the filter 104 at a temperature of at least 105° C., to remove the silicon powder from the exhaust gas, and give a mixed gas that contains the hydrogen and the oligomers of silanes (see FIG. 1).

The filter 104 is provided in the filter apparatus 102. The filter 104 is specified from the point of view of a heat resistance property and a corrosion resistance property. A bag filter and an element (a porous sintered body) are used preferably for the filter. It is preferable that aperture mesh opening of the filter is in the range of 0.1 μm to 100 μm, preferably in the range of 1 μm to 30 μm in consideration of a particle size and a removal rate of a silicon powder that is contained in the reaction exhaust gas. The upper temperature limit of the bag filter depends on the upper temperature limit of a resin that constitutes the filter. When the filter 104 is made of a PTFE resin, the upper temperature limit of the bag filter is 280° C. generally.

Consequently, the temperature range which is below heat resistance temperature of the filter and at which oligomers of silanes in the exhaust gas do not adhere to the filter is usually 105° C. to 280° C. Therefore, it is preferable that the exhaust gas is supplied to the filter 104 at a temperature in the range of 105° C. to 280° C. and the exhaust gas is discharged from the filter 104 at a temperature in the range of 105° C. to 280° C. By this step, the silicon powder is removed by the filter 104, and the oligomers of silanes in a gas phase together with the hydrogen, the hydrogen chloride and the chlorosilanes passes through the filter 104 without adhering to the filter.

A heating part may be provided and keep the filter 104 warm in order to discharge the exhaust gas from the filter 104 at the above temperature.

In the process for producing silicon according to the present invention, it is preferable that other filter apparatuses (not shown) are connected in parallel to the filter apparatus 102. This ensures that the filter can be exchanged to another filter without stopping the production when the performance of the filter is degraded by using over a long period of time. The filters can be exchanged by switching the filter apparatuses.

In this embodiment, the process further includes a step [6] for exchanging the filter to another filter that has been heated up to a temperature equivalent to or higher than a temperature at which the oligomers of silanes in the exhaust gas supplied to the filter is not condensed (generally 105° C. or higher, preferably 130° C. or higher, most preferably 150° C. or higher) when the filter 104 is exchanged to another filter that is connected in parallel. Preliminary heating another filter is advantageous because when the exhaust gas comes into contact with the preliminarily-heated filter, there is no rapid decrease in temperature, whereby no oligomers of silanes are prevented from liquefied on the filter. Consequently, the silicon powder and oligomers of silanes can be advantageously prevented from tightly adhering to the filter, whereby silicon can be produced safely and continuously. Moreover, it is preferable that the upper limit of the preliminary heating temperature is 280° C. in view of the material of the apparatus as described above.

Moreover, it is preferable that the filter is preliminarily heated up to a temperature of the exhaust gas that is introduced to the filter (generally 105° C. or higher, preferably 130° C. or higher, most preferably 150° C. or higher) when the process for producing silicon according to the present invention is started. Furthermore, it is preferable that the upper limit of the preliminary heating temperature is 280° C. in view of the material of the apparatus as described above.

In the process for producing silicon according to the present invention as described above, by the steps [2] and [3], the oligomers of silanes can be prevented from adhering to the filter, whereby the frequency of opening the filter for maintenance can be reduced, and silicon can be manufactured in safety and in a continuous manner. More specifically, in a conventional case where the exhaust gas that contains the silicon powder and the oligomers of silanes that exist as a liquid phase is introduced to the filter apparatus, both of the oligomers of silanes and the silicon powder tightly adhere to the removing means. In this case, it is impossible to remove the oligomers of silanes and silicon powder only by brushing them off. Consequently, regenerating the removing means requires a dangerous maintenance of opening the filter. On the other hand, by the steps [2] and [3] of the process for producing silicon according to the present invention, since the silicon powder adheres to the filter alone, the removing means can simply regenerated by brushing the powder off. Moreover, since the mixed gas that can be obtained in the step [3] of the process for producing silicon according to the present invention does not contain the silicon powder, the oligomers of silanes can be easily collected as a liquid phase from the mixed gas in another process following the step [3] of the process for producing silicon according to the present invention.

[Separation Step [4]]

The separation step [4] is a step for cooling the mixed gas that has been obtained in the step [3] by the cooling part 106 to separate hydrogen B as a gas phase from the mixed gas (see FIG. 1).

The heat exchanger is preferably used as the cooling part 106. A cooling temperature is not restricted as long as that the cooling temperature is a temperature at which a part of the chlorosilanes and oligomers of silanes is condensed. In general, it is preferable that the cooling temperature is a temperature at which the chlorosilanes are condensed. For instance, the cooling temperature is 10° C. or less, preferably −10° C. or less, most preferably −30° C. or less. The cooling can be carried out by publicly known methods. More specifically, the cooling is carried out in one stage or multiple stages, and the hydrogen is separated as a gas phase. Moreover, the gas can also be pressurized in the cooling.

[Supply Step [5]]

The supply step [5] is a step for supplying the hydrogen B that has been obtained in the step [4] to the reactor 100 (see FIG. 1). More specifically, the hydrogen B passes through the supply pipe 108 and is supplied to the reactor 100.

The chlorosilanes C that have been removed in the separation step [4] can be purified and supplied to the reactor 100.

Since the reaction exhaust gas also contains hydrogen chloride, the hydrogen B that has been collected contains the hydrogen chloride too. Therefore, the hydrogen that has been separated is recirculated to the reduction step after the hydrogen chloride is removed in general. The removal method is not restricted in particular. For instance, the hydrogen chloride can be removed by making the hydrogen B that contains the hydrogen chloride come into contact with raw silicon at a temperature in the range of 280° C. to 400° C. and by reacting the hydrogen chloride in the hydrogen B with the raw silicon to give trichlorosilane. Moreover, the hydrogen chloride can also be removed by making the hydrogen B that contains the hydrogen chloride pass through a layer that is filled with an adsorption agent such as activated carbon and by making the hydrogen chloride adsorb to the layer.

EXAMPLES

The present invention will be described in greater detail hereinbelow by presenting examples without limiting the scope of the invention.

Example 1

Example 1 will be described with reference to FIGS. 1 and 2. As a reaction apparatus, The reaction apparatus 11 shown in FIG. 2 was used. With respect to the shape of the reactor 100, a graphite-made reaction tube was provided with an opening part at the lower end and had an inner diameter of 25 mm, an outer diameter of 55 mm and a length of 50 cm. A high frequency heater was used as a heater 3, and the vessel was heated so that the temperature of the inner surface of the reactor is 1300° C. After that, a mixed gas containing 2 NL/min of trichlorosilane and 20 NL/min of hydrogen was supplied from the source gas supply pipe 2 to carry out a deposition reaction of silicon.

The temperature of an exhaust gas was ca. 1050° C. at the outlet port of the reactor 100. Moreover, a part of the exhaust gas was sampled to carried out a chemical composition analysis by using a gas chromatography. As a result, the amount of oligomers of silanes including $Si_2Cl_6$ was 0.02% by mole in the exhaust gas.

The above exhaust gas was carried from the exhaust gas collecting chamber 4 to the filter apparatus 102 via the gas discharge pipe 5. The exhaust gas had been cooled to 130° C. before the exhaust gas was supplied to the filter 104 of the filter apparatus 102.

As the filter 104, an element filter made of stainless steel was used. The temperature of the exhaust gas was measured at an outlet port of the filter, and it was found that the temperature was 105° C. Moreover, the filter 104 was preliminary heated up to 130° C. when the production of silicon was started, and the temperature of the filter 104 was kept at 110° C. while the production of silicon was carried out.

After a silicon powder was removed from the exhaust gas, the exhaust gas was cooled to −10° C. by the cooling part 106. The exhaust gas was then separated into a liquid containing chlorosilanes and oligomers of silanes and hydrogen (containing hydrogen chloride). Trichlorosilane was extracted from the above chlorosilanes by a distillation, and the trichlorosilane was used again as a raw material in the reduction step. The hydrogen chloride was removed from the above hydrogen (containing hydrogen chloride) by an activated carbon, and the purified hydrogen was used again as a raw material in the reduction step.

As a result, the operation was continuously carried out for as long as 50 hours, i.e. while a differential pressure of the filter was increased from approximately 3 kPa at the beginning to approximately 10 kPa. Moreover, in the regeneration of the filter, the silicon powder was easily brushed off from the filter without washing.

Moreover, the filter and the cooling part were opened and checked in safely, and no residual oligomers of silanes in the form of a liquid were confirmed. The results are shown in Table 1.

Example 2

For Example 2, the operation that is similar to Example 1 was carried out except that 2 NL/min of trichlorosilane in Example 1 was changed to 2 NL/min of silicon tetrachloride and that a temperature of the inner wall of the reactor was adjusted to 1400° C. As a result, the operation was continuously carried out for as long as 50 hours, i.e. while a differential pressure of the filter was increased from approximately 3 kPa at the beginning approximately 10 kPa. Moreover, in the regeneration of the filter, the silicon powder was easily brushed off from the filter without washing. The results are shown in Table 1.

over, it was required that the silicon powder had to be removed from the filter by washing in the regeneration of the filter. The results are shown in Table 1.

TABLE 1

|  | Example 1 | Example 2 | Example 3 | Comparative example 1 | Comparative example 2 |
|---|---|---|---|---|---|
| Raw material | Trichlorosilane | Silicon tetrachloride | Trichlorosilane | Trichlorosilane | Trichlorosilane |
| Filter inlet port | 130° C. | 140° C. | 130° C. | 80° C. | 130° C. |
| Filter outlet port | 105° C. | 110° C. | 105° C. | 65° C. | 95° C. |
| Time taken for a differential pressure to reache 10 kPa (hour) | 50 | 50 | 50 | 1 | 3 |
| Status confirmed in opening a filter | Satisfactory | Satisfactory | Satisfactory | Liquid substance exists | Liquid substance exists |

Example 3

In Example 3, the operation that is similar to the example 1 was carried out except that two filter apparatuses were prepared and the following operation was carried out. More specifically, two filter apparatuses were connected in parallel via a cut-off poppet valve and switched periodically by the cut-off poppet to use the filters alternately. One filter was switched to another filter after the temperature of another filter was heated up to 130° C. in advance, and then the temperature of the filter was kept to 110° C. during the production of silicon. As a result, the operation was continuously carried out for as long as 50 hours, i.e. while a differential pressure of the filter was increased from approximately 3 kPa at the beginning to approximately 10 kPa. Moreover, in the regeneration of the filter, the silicon powder was easily brushed off from the filter without washing. Furthermore, the continuous operation for a long period of time was possible by the switching. The results are shown in Table 1.

Comparative Example 1

For Comparative Example 1, the operation that is similar to Example 1 was carried out except that the exhaust gas was cooled to 80° C. at the filter inlet port.

As a result, it took only one hour to increase a differential pressure of the filter from approximately 3 kPa at the beginning to approximately 10 kPa. After that, a rapid increase in the differential pressure of the filter occurred again. Moreover, it was required that the silicon powder had to be removed from the filter by washing in the regeneration of the filter. The results are shown in Table 1.

Comparative Example 2

For Comparative Example 2, the operation that is similar to Example 1 was carried out except that the temperature of the filter was not maintained (the temperature of the exhaust gas at the filter outlet port was 95° C.).

As a result, it took only one hour to increase a differential pressure of the filter from approximately 3 kPa at the beginning to approximately 10 kPa. After that, a rapid increase in the differential pressure of the filter occurred again. More-

EXPLANATIONS OF LETTERS OR NUMERALS

2: Source gas supply pipe
3: Heater
4: Exhaust gas collecting chamber
5: Gas discharge pipe
100: Reactor
7: Heat insulator
8: Carbon material
9: Heat insulator
10: Metal wall
11: Reaction apparatus
102: Filter apparatus
104: Filter
106: Cooling part
108: Supply pipe

The invention claimed is:

1. A process for producing silicon, comprising the steps of:
a reduction step [1] of depositing silicon by reacting chlorosilanes and hydrogen in a reactor under heat and discharging an exhaust gas that contains hydrogen, oligomers of silanes, and a silicon powder;
a carrying step [2] of carrying the exhaust gas that has been exhausted in the step [1] while keeping a temperature of the exhaust gas at not less than 105° C.;
a removal step [3] of supplying the exhaust gas that has been carried in the step [2] to a filter at a temperature of not less than 105° C. and discharging the exhaust gas from the filter at a temperature of not less than 105° C. to remove the silicon powder from the exhaust gas and give a mixed gas that contains the hydrogen and the oligomers of silanes;
a separation step [4] of cooling the mixed gas that has been obtained in the step [3] to separate the hydrogen as a gas phase from the mixed gas; and supply step [5] of supplying the hydrogen that has been obtained in the step [4] to the reactor.

2. The process for producing silicon according to claim 1, wherein the filters are disposed in parallel and switched to one another in the carrier step and the process further comprises a step [6] of switching to the filter that has been heated up to 105° C.

3. The process for producing silicon according to claim 1, wherein the deposition temperature in the step [1] is not less than 1200° C.

4. The process for producing silicon according to claim 2, wherein the deposition temperature in the step [1] is not less than 1200° C.

5. The process for producing silicon according to claim 1, wherein the removal step [3] is a step of supplying the exhaust gas that has been carried in the step [2] to a filter at a temperature in the range of 105° C. to 280° C. and discharging the exhaust gas from the filter at a temperature in the range of 105° C. to 280° C. to remove the silicon powder from the exhaust gas and give a mixed gas that contains the hydrogen and the oligomers of silanes.

* * * * *

UNITED STATES PATENT AND TRADEMARK OFFICE
CERTIFICATE OF CORRECTION

PATENT NO. : 8,124,041 B2  Page 1 of 1
APPLICATION NO. : 12/937912
DATED : February 28, 2012
INVENTOR(S) : Manabu Sakida et al.

It is certified that error appears in the above-identified patent and that said Letters Patent is hereby corrected as shown below:

Face of Patent, Column 2, Item (57) Abstract, Line 5, delete "carring" and insert -- carrying --

Signed and Sealed this
Fifteenth Day of May, 2012

David J. Kappos
*Director of the United States Patent and Trademark Office*